(12) United States Patent
Herasymchuk

(10) Patent No.: US 9,152,635 B2
(45) Date of Patent: Oct. 6, 2015

(54) METHOD OF AND SYSTEM FOR MULTILEVEL CREATION OF CONSOLIDATED DYNAMIC PLAYLIST AND UTILIZATION THEREOF

(71) Applicant: Vasyl Herasymchuk, Lviv (UA)

(72) Inventor: Vasyl Herasymchuk, Lviv (UA)

( * ) Notice: Subject to any disclaimer, the term of this patent is extended or adjusted under 35 U.S.C. 154(b) by 0 days.

(21) Appl. No.: 14/247,340

(22) Filed: Apr. 8, 2014

(65) Prior Publication Data

US 2014/0207762 A1 Jul. 24, 2014

Related U.S. Application Data

(62) Division of application No. 13/495,293, filed on Jun. 13, 2012, now Pat. No. 8,738,660.

(51) Int. Cl.
*G06F 17/30* (2006.01)

(52) U.S. Cl.
CPC .................... *G06F 17/30029* (2013.01)

(58) Field of Classification Search
USPC ............. 707/607, 609, 687, 705, 790, 813
See application file for complete search history.

(56) References Cited

U.S. PATENT DOCUMENTS

2008/0109306 A1* 5/2008 Maigret et al. .................. 705/14
2012/0221528 A1* 8/2012 Renkes et al. ................ 707/674

* cited by examiner

*Primary Examiner* — Sana Al Hashemi
(74) *Attorney, Agent, or Firm* — Defillo & Associates, Inc; Evelyn A. Defilló

(57) ABSTRACT

A method and system that includes an aggregation of clients' playlists, separate item names, and a systems own playlists that are converted to request lists. A consolidated dynamic playlist is created by a computer algorithm, which provides an order of priority depending on input variables. Depending on a system mode, consolidated dynamic playlist of a lower level can participate in higher level session of the system.

6 Claims, 12 Drawing Sheets

METHOD OF AND SYSTEM FOR MULTILEVEL CREATION OF CONSOLIDATED DYNAMIC PLAYLIST AND UTILIZATION THEREOF

REFERENCE TO RELATED APPLICATIONS

This is a divisional of U.S. patent application Ser. No. 13/495,293 filed on Jun. 13, 2012.

FIELD OF THE INVENTION

The present invention relates to methods and systems for composing playlists and utilization thereof.

BACKGROUND OF THE INVENTION

Nowadays, playlists are widely used in different types of devices and systems for playing back different kinds of media files. Media files might represent audio and/or visual information stored locally or on the Internet. Web located media files and services offer to a user comprehensive source and tools for composing playlists and their utilization (playing back). Methods for sharing playlists, as well as giving and using recommendations for the playlist to be used for personal entertainment are disclosed, for instance, in the following Patent Applications Publication: US20080147711, US20060195479, US20060143236, and US20060195480

Besides, users can accept the playlist order offered by web services and listen to web radio. U.S. Pat. No. 7,720,686 discloses a variant of such a system, which also includes a possibility to order a song of a user's choice and such songs will be included in one of the playlists that will be streamed in some time. Such service gives lesser flexibility in terms of listening to the exact kind of music one prefers, but still a general genre selection is available. Main advantages of such systems are that there is no need for particular users to get involved into composition of the playlists.

On the other hand, Patent Applications Publication US20080249874 and US20110199180 describe systems that allow ordering songs for public entertainment to be reproduced at the places of common listening.

Pleasure of public listening to the music or sensing any other kind of multimedia reproduction, whether through individual devices or through any kind of the system of a third party, is not limited with actual favorite music, but also it consists in great scale of a chance to express one's individuality, to show his/her social self-identity and general artistic taste. It's also important to have a flexibility to adjust or to choose a session one takes part in to achieve a desirable level of correspondence to his/her own preferences. Entertaining effect can also be improved if a system allows modifying the session, merging into a higher level of playlist creation or mutual playlist creation with other clients.

SUMMARY OF THE INVENTION

Methods of and systems for multilevel creation of consolidated dynamic playlists and for utilization thereof are disclosed.

In one aspect, a method comprises aggregation of clients' playlists, separate item names, input consolidated dynamic playlists and system own playlists, that become request lists and while such clients are connected to the system, into at least one consolidated dynamic playlist according to established algorithm, which provides a certain order of priority depending on input variables. The same rules are applied to input consolidated dynamic playlist creation and such client's request list that represents input consolidated dynamic playlist has an assigned priority level.

In another aspect of the method, its algorithm regards sequence of a particular request of a client relative to other clients' requests, frequency of a particular item name appearance on the individual request lists of clients, client's status, input consolidated dynamic playlist priority level and time period after last execution of a particular item as input variables.

Another aspect, the method can make consolidated dynamic playlists dependant on at least one different consolidated dynamic playlist, run within the system.

In another aspect, the method can comprise selecting a portion of available clients' request lists based on frequency of appearance of mutual item names on individual request lists, establishing correlation between the particular consolidated dynamic playlist, participating individual request lists and corresponding clients and making this particular consolidated dynamic playlist available for such clients Besides, a client can make an adjustment by requesting a match percentage of item names in one's individual request list and the system regards said requested match percentage as a variable for determining the selection of participating request lists for creating a consolidated dynamic playlist.

In another aspect, particular item names on the consolidated dynamic playlist can be replaced when executed for a particular client with individual playlist item names by the choice of this client.

In one aspect of the system, it comprises client identity information and client program, installed on client devices that have means of connection to a network server or another client device, client databases, that include at least one playlist, associated multimedia information that can be assigned to a particular individual playlist, its part or entire playlists database and indicative multimedia information, that identifies corresponding clients. Such associated and indicative information can be executed about the time of execution of corresponding request list items. Besides, it has a network server with a database, containing information about registered clients, at least one network server program, containing means to enable composition of the consolidated dynamic playlist using client's requests. Further, it has at least one consolidated dynamic playlist. Also, it contains at least one server database of items available to chose from and execute by the system. Further, a network server program or a client device program after initiating a system session facilitates sending invitations to a client once the client's device becomes accessible through the connection protocol for the said network server or client device and terminating of client's participation in current session once the client's device becomes inaccessible through the connection protocol for the said network server or client device and provides to a client a choice to lock his participation in a current session for a certain period of time even if his device becomes inaccessible through the connection protocol. Besides, a client device program facilitates initiation of connection to a network server or another client device once such server or client device becomes accessible through the connection protocol and terminating of connection to a network server or another client device by the choice of the client and the server program or another client device program facilitates terminating of a client's participation in the current session. The system has means to identify client's information once the client device has joined the system by establishing connection with the network server or another client device, to consider a corresponding playlist as a request list and to rearrange at least one current consolidated dynamic playlist with addition of the client's request list items per established algorithm, and to identify client's information once the client device has left the system, to consider a corresponding request list as terminated out of the current session and to rearrange at least one current consolidated dynamic playlist with deduction of the client's request list items per established algorithm.

In another aspect of the system, a client device is connected with peripheral equipment that comprises means to process audio signals and convert them into sound and to process visual information and convert it into visual images.

In another aspect of the system, a consolidated dynamic playlist composed through one client device, that has initiated the system session and sub-network formation, is accessible and executable by other remote client devices, which are not connected directly to the said client device. Such remote client devices can participate in the consolidated dynamic playlist composition with the clients; request lists and other clients' databases.

In another aspect of the system, two clients can assign to each other exclusive status that allows one of the clients selecting other clients and initiating a separate system session and such initiation causes the system sending invitations to these clients, acceptance of which will form a separate system network session.

In another aspect of the system, the indicative multimedia information represents broad genre, style, branch or so of the requested consolidated dynamic playlist item.

In another aspect of the system, it provides to a client capability to initiate multimedia information through a client's device interface by a choice of a client in order to reflect the client's opinion of the currently executed consolidated dynamic playlist item.

In another aspect of the system, it provides to a client the capability to choose templates of multimedia information through a client's device interface to be added to the client's database in order to be used for any interaction with the system; furthermore such templates are modifiable by a client.

In another aspect of the system, it provides execution of media files per consolidated dynamic playlist that includes transmission of the information, which can employ streaming over the internet or radio waves broadcasting as a transmission media.

DETAILED DESCRIPTION OF THE INVENTION

A method and system for multilevel creation of consolidated dynamic playlists and the utilization thereof as described herein. Input information for creation of the consolidated dynamic playlists originates from individual playlists that become request lists as well as "on the fly" requests of the clients of the system. Besides, another consolidated dynamic playlist can be one of the component sources for the main consolidated dynamic playlist composition. Under such settlement, an input consolidated dynamic playlist would act like any other individual playlist of this level of the system. The system detects all active clients, in other words those connected to the system at the given moment, and composes the consolidated dynamic playlist. While number one from the playlist is executed (played back and/or displayed), the playlist is updated as a result of change of the input information, like a client joining or leaving the system or clients' activities relevant to their playlists or instant requests. Following embodiment of the method of multilevel creation of the consolidated dynamic playlist is described. After that, embodiment of the system for multilevel creation of the consolidated dynamic playlist and for utilization of one is described. Some additional details on the method are reviewed while the system embodiment is described. Music composition was elected as a subject of the playlist for this description.

Figure 1:
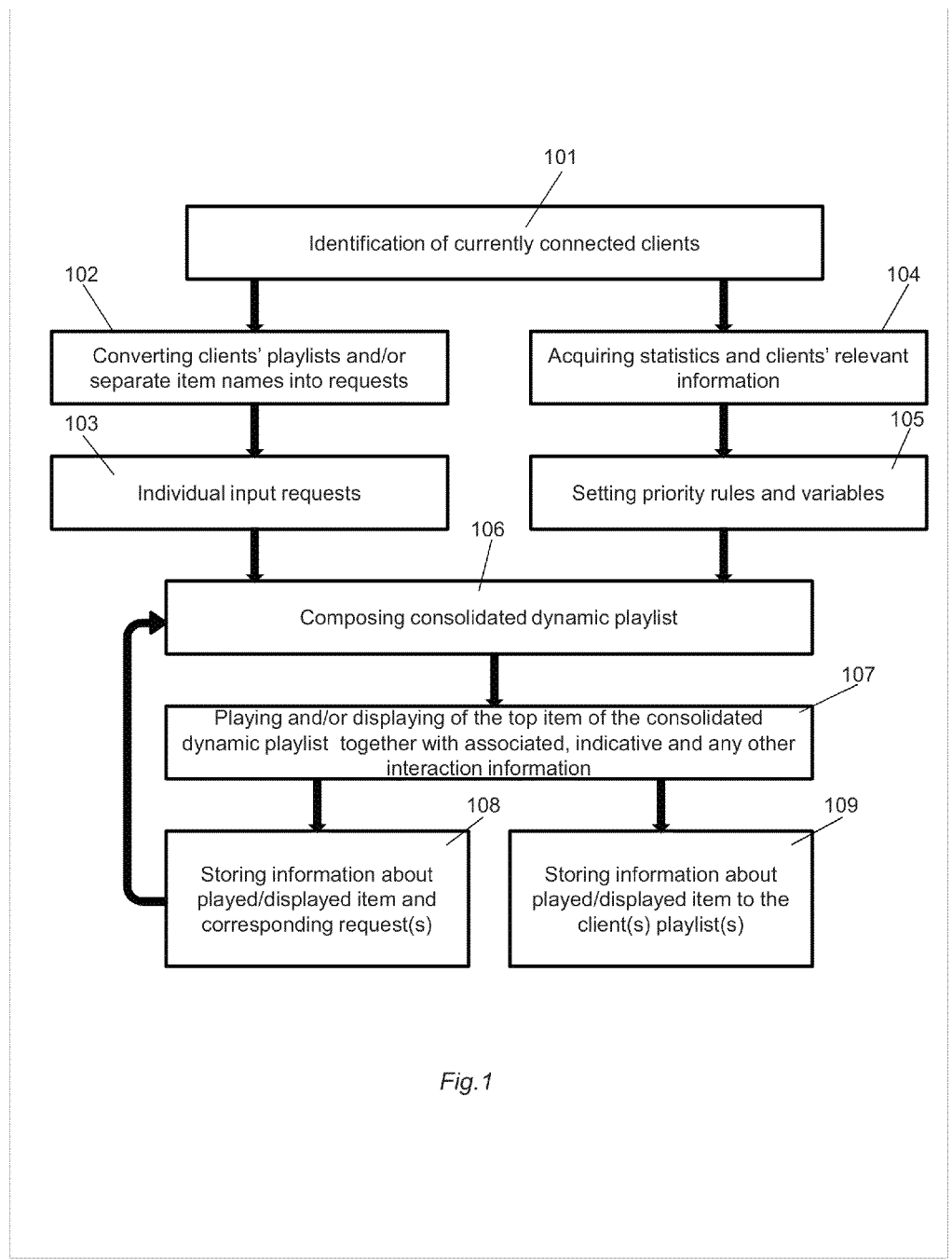
FIG. 1 is a flowchart depicting the general process of composing consolidated dynamic playlists out of individual requests of connected client devices.

As it's shown on the FIG. 1, process of composing the consolidated dynamic playlist out of individual requests of connected client devices consists of several logical steps that consequentially results in creating and constantly updating the consolidated dynamic playlist. It starts with Identification of currently connected clients 101. Each client might have either ready playlists, stored in client's database, or instant separate item names, or both of these. The system converts active clients' playlists and/or separate item names into requests 102. This results in plurality of individual input requests 103. In the same time the system acquires statistic data and clients' relevant information 104. Gathering statistic data will allow the system to get necessary variable values to be used while the algorithm for composing the consolidated dynamic playlist is applied. Such variables might be a time period after a particular song was played back, time period after request of a particular client was executed, number of clients having the same song name in their playlists, location number of such song in each playlist, etc. Each client database can also contain information relevant to such system variables, like a status due to some contractual configuration (prepayment for the system service or any other payment arrangements), bonuses, etc. Besides, client databases can contain visual and/or audio information to be associated with this client, client's database or its part. So, the system sets priority rules and variables 105. This together with actual input requests allows composing consolidated dynamic playlists 106. The top item of the consolidated dynamic playlist is grabbed from its database location and executed (played back) 107. In the same time system may display the name of the item playing. Also, the system can execute visual and/or audio information associated with databases initiated requests for this item to be played. Information about played item and corresponding request(s) is stored 108 and serves as one of the input variables for updating the playlist 106. In the same time this information is also stored to the involved clients' databases 109, which may result in moving the just played item to the end of the list and shifting other items of their playlists upwards. Then the process cycles and in case input information was changed in any respect, the system processes the input data and makes corresponding changes to the consolidated dynamic playlist.

Provided schematic depicts the flowchart for one level creation of consolidated dynamic playlist. It's meant within this description that each consolidated dynamic playlist composed through such a procedure may represent and can play the role of input request list for the generation of consolidated dynamic playlist of a higher level.

Figure 2:
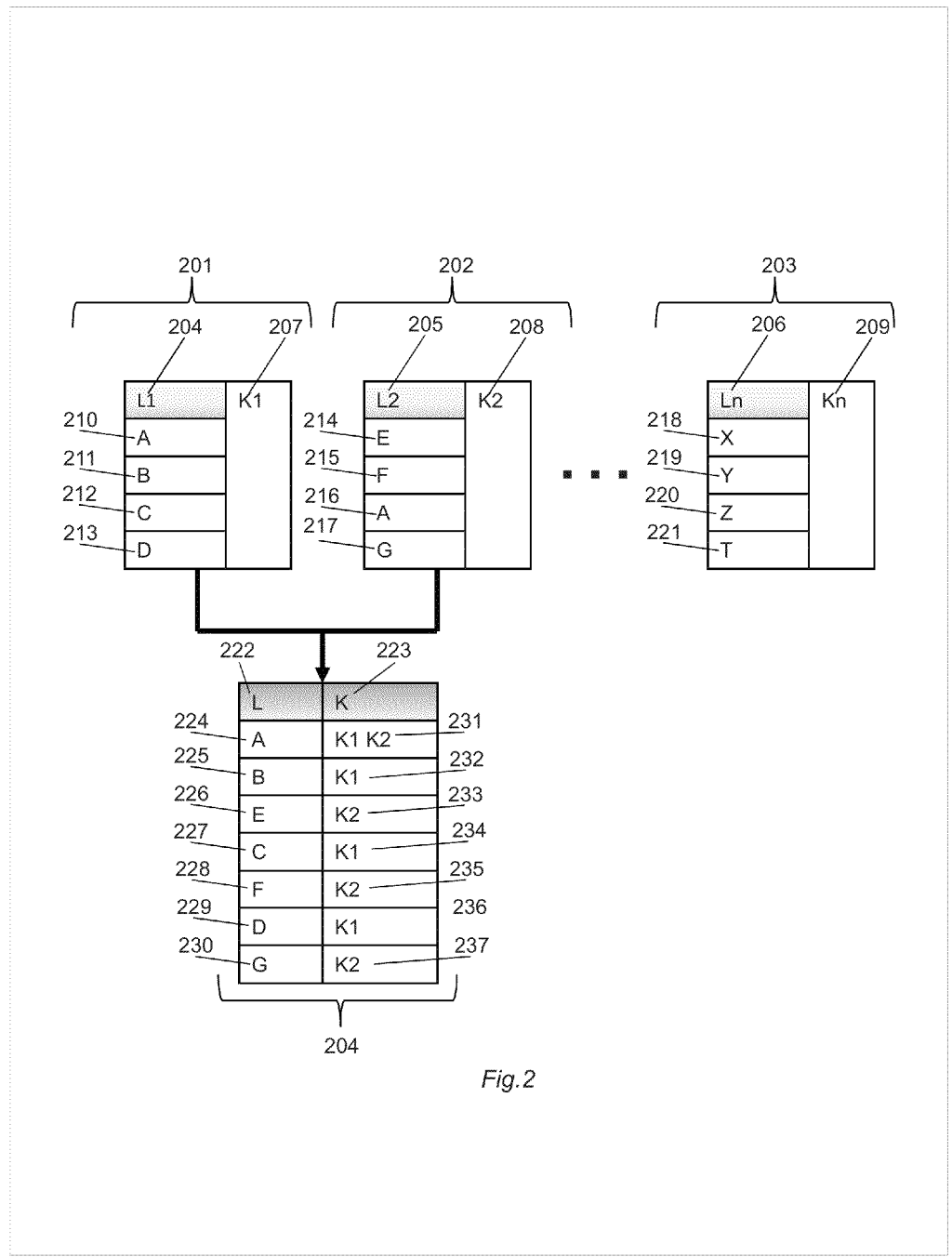
FIG. 2 is an example of an algorithm application that uses certain rules for the system variables in order to create consolidated dynamic playlists with a list of associated items.

An algorithm for composing the consolidated dynamic playlist can be established in different ways. Also, it could be changed by the system user in order to achieve a desirable mode for the list composition. FIG. 2 shows a simplified example of such playlist composition per some algorithm Generally speaking there would be numerous clients connected to the system, thus making their databases 201, 202, . . . , 203 available for the system In this example, the leftmost database 201 represents the client that joined the system first. The one with database 202 joined next, etc. Each of these databases includes playlist 204, 205, . . . , 206 that has to be converted into the request to the system. Those databases, that currently don't have available playlists or individual item names to be converted into the request, are just ignored until such information will be entered by corresponding clients. Each of said playlists contains a number of items (song names): 210, 211, 212, 213 for the list 204; 214, 215, 216 and 217 for the list 205; 218, 219, 220, 221 for the list 206. Besides, each of the databases can contain a list of associated media items 207, 208 . . . , 209. In the given example, one item is associated with each of the client databases. In other embodiment there can be a plurality of items in the list of associated items or they can even be arranged in a number of lists. They can also be added "on the fly". Also, indicative information may be a part of a client database.

In the given example, only two first databases 201 and 202 are taken into account in order to describe the principle of the consolidated dynamic playlist composition. After the system processes the input information per flowchart on the FIG. 1, it generates a new dynamic database 204, which consists of a consolidated dynamic playlist 222 and list of associated items 223. As it's shown on the FIG. 2, item "A" (224) is put on the first position of the consolidated dynamic playlist. The reason for this is that it was the item number on the list 204 of the database 201 and the same item "A" (216) was on the list 205 of the database 202. Because of that, there are two items "K1" and "K2" (231) on the list of associated items 223. Execution of these two associated items will indicate that the order of both clients is performed. In this embodiment, the next item "B" (225) in the consolidated dynamic playlist 222 is taken from the list 204 of the database 201 again, since by this moment orders dictated by both 201 and 202 databases are considered completed and the next turn is to get the following item from the database 201.

However, in other embodiments or for other modes of the system, the algorithm can be different. For instance, the location number of the item "A" (210 and 216) in individual playlist, which is "1" for the playlist 204 of the database 201 and "3" for the playlist 205 of the database 202, can be used as a factor to reduce some criteria of order fulfillment. So, let's say list 204 would have such criteria value equal to "1", while list 205 would have one equal to "0.9" due to location of the item "A" further down on the list comparing to the list 204. Such algorithm would take the next item from the list 205 of the database 202.

Following items 225, 226, 227, 228, 229, 230 of the consolidated dynamic playlist 222 are taken sequentially from the playlist 205 and 204. Item "A" (216) of the playlist 205 of the database 202 is omitted, since its considered to be already played. Associated items that correspond to 201 and 202 databases form the list of these items 223 in the dynamic database 204.

Figure 3:
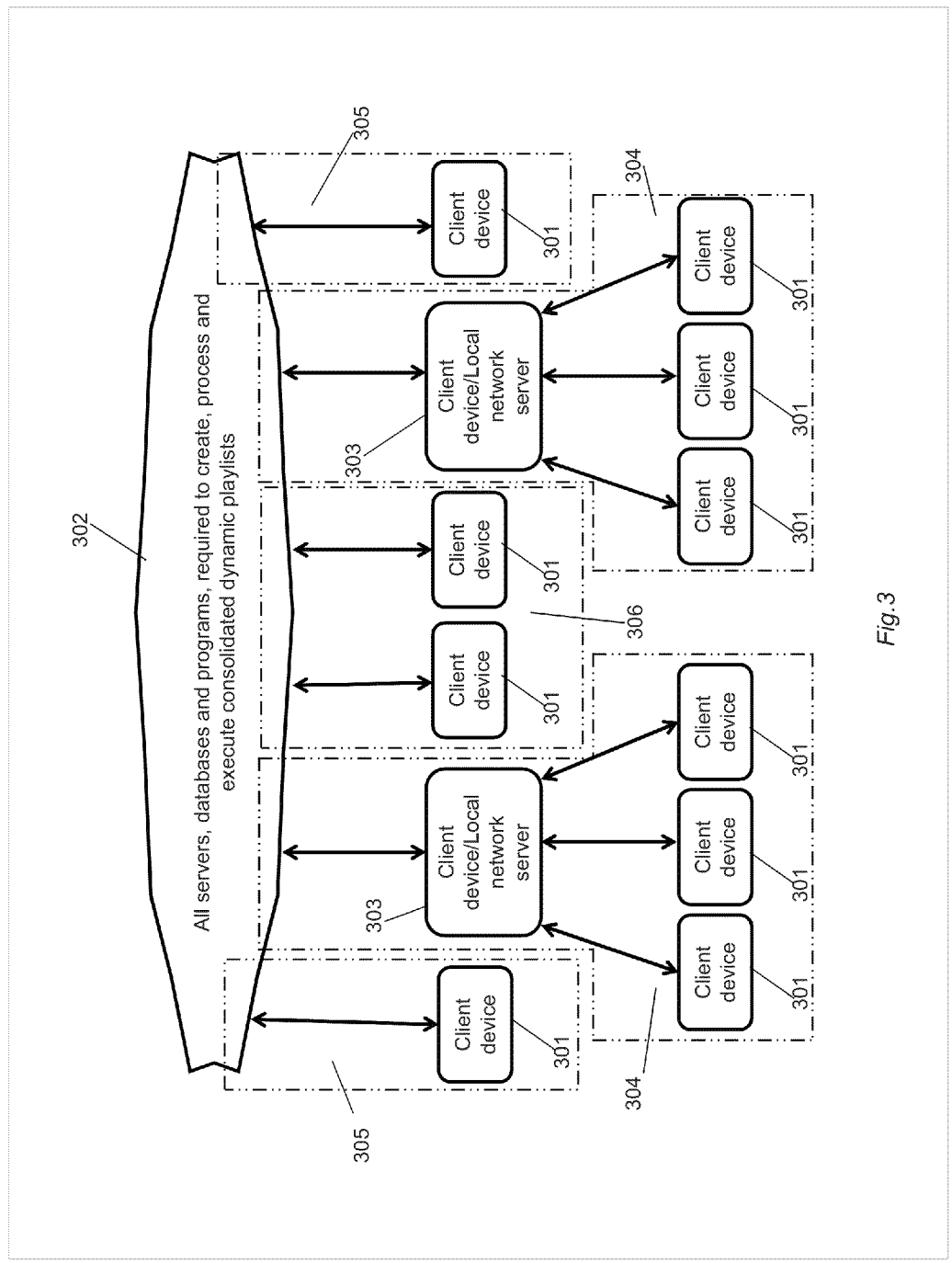
FIG. 3 is a schematic of the system embodiment.

Embodiment of the system that involves two levels of clients is depicted by the schematic shown on the FIG. 3. The system includes both client devices 301 connected directly to the top level server 302, responsible for composition of the consolidated dynamic playlist, and clients connected through other client devices 303 that play the role of local network servers. For the purpose of this description, blocks of this schematic presents three types of entities: client device 301, all servers, databases and programs required to create, to process and to execute consolidated dynamic playlist 302 and client device/local network server 303. Connection 304 of the client device 301 to the system through the local network server 303 represents second (or down) level client connection. Direct connection 305 of the client device 301 to the system represents first (or top) level client connection. Any of the client devices 301 can connect to the system by either of these methods. Any of the client devices 301 can be a local network server, providing it has necessary technical capabilities. The way client starts his participation in the session, options he has and the way he leaves the session are described for each of the connection types. This embodiment assumes many consolidated dynamic playlists running concurrently. Each of the connections through local network server 304 has its own consolidated dynamic playlist. This consolidated dynamic playlist can be executed separately or it can be converted into a request list and participate in composition of the top level consolidated dynamic playlist. All of the direct connections 305 result in one consolidated dynamic playlist, except for the case when client chooses to set some kind of a filter, which would require a separate or modified consolidated dynamic playlist. Besides, two or more clients can start and the system will support separate sessions (connection type 306), so these clients' playlists will be a base for a consolidated dynamic playlist creation for this separate group. Similarly to local network, such groups can use their consolidated dynamic playlist and participate in top level consolidated dynamic playlist creation. In fact, such virtual separate groups act as a second level of the system with the only difference being comparing to the connection type 304 that it uses means and resources of the top level server 302 for arranging this separate group. Each of the local network servers 303 can act like a client device 301 with its own playlist and/or playlists of clients that have joined the session through this server (connection type 304), and participate in consolidated dynamic playlist session together with other client devices 301 connected directly (type 305) to the system. In particular cases, two or more of such clients/local network servers can start and the system will support separate sessions (connection type 306).

Figure 4:
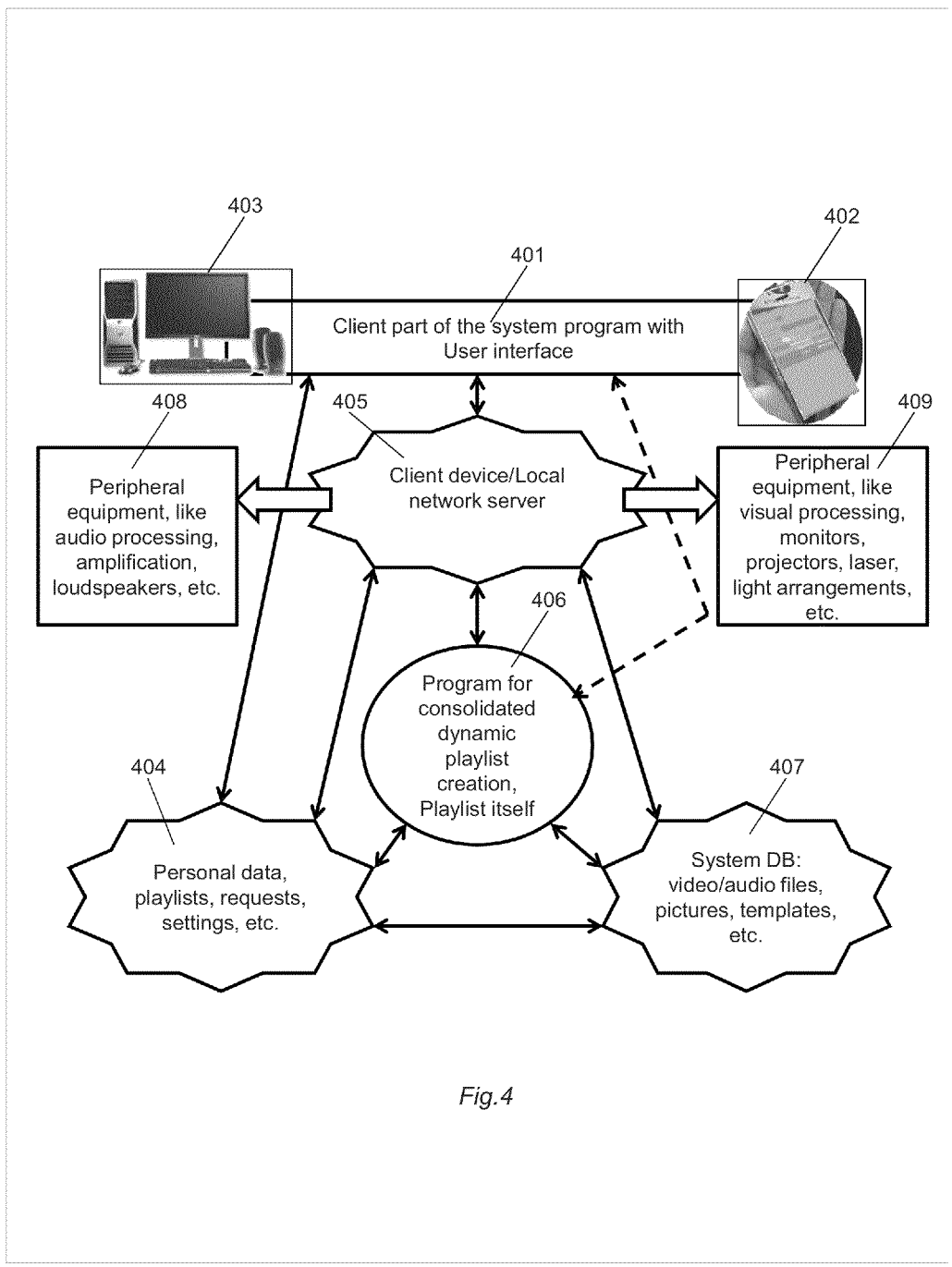
FIG. 4 is a schematic of the system down level connection configuration.

Following is the description of the way the system works for the connection type 304 (FIG. 3). A person willing to join the system downloads a software to be installed on his mobile 402 (FIG. 4) and/or desktop 403 devices, like smartphone, PC, netbook PC, etc. The client registers on the system and, optionally, creates his database 201 (FIG. 2): favorite playlists 204, visual and/or audio information 207, associated with his database 201 or its part.

The client part of the system program 401 contains the client's identity information and links his/her device to his/her personal database 404. The client's device 402 or 403 may communicate with corresponding client databases 404 both directly and via another client device/local network server 405, which belongs to some business owned or municipal place or even is in personal ownership. The program for consolidated dynamic playlist creation 406 gets necessary information from the client database 404, another client device/local network server 405 and system database 407. Another client device/local network server 405 accesses required media files from the system databases 407 per the consolidated dynamic playlist 406. Herein, any third party databases of media information, like songs, were not separated from the system databases 407. In fact, there may be several third party server databases besides the one that actually belongs to the system. The server 405 executes requested and associated files. It's connected with peripheral equipment 408 and 409, which allows to process audio and/or visual information and to reproduce all requested media.

Figure 5:
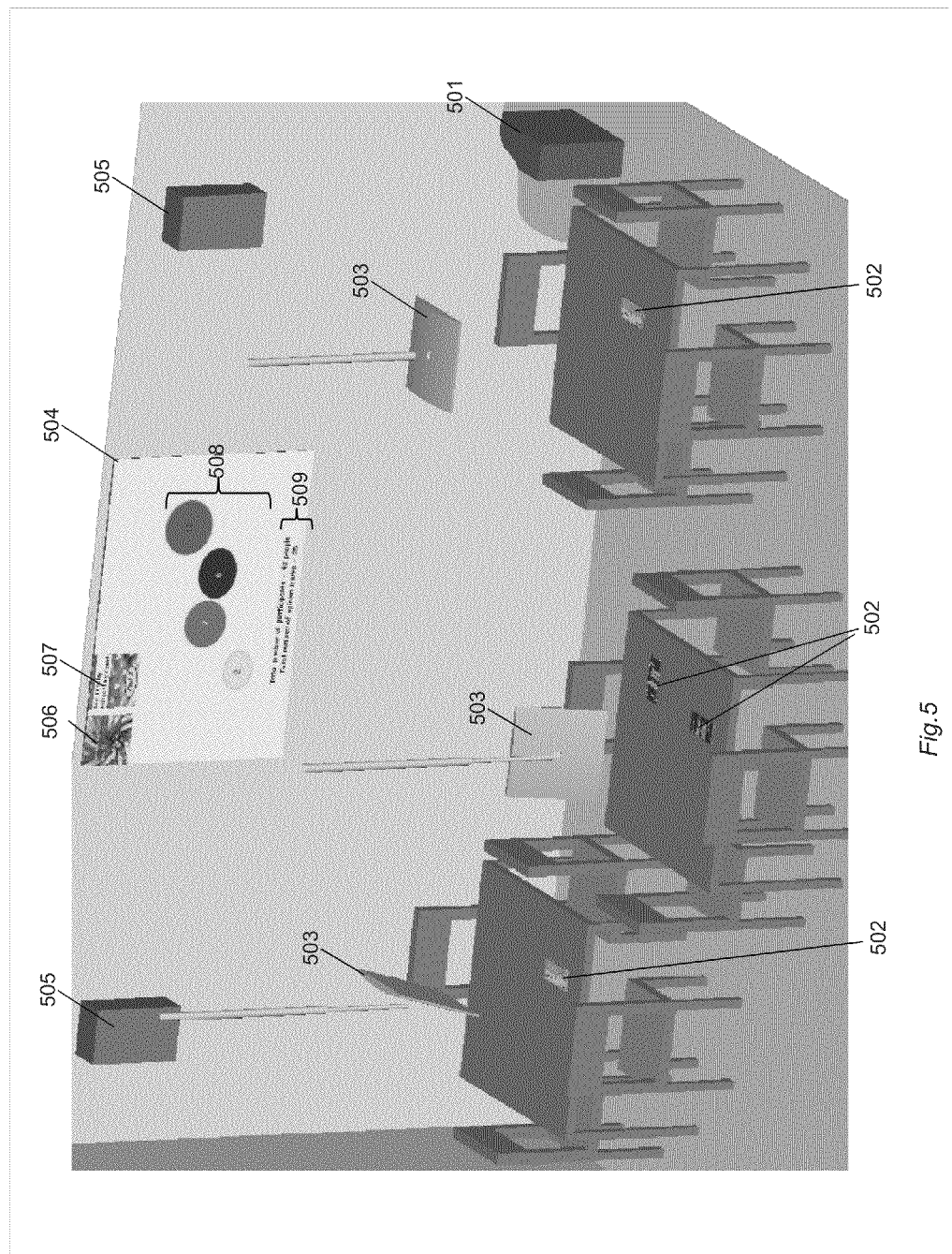
FIG. 5 is an example of an environment view for the system down level arrangement.

An example environment view for the system with connection type 304 (FIG. 3) is shown on the FIG. 5. In the given example, it's an arrangement for some restaurant. Beside usual things for this kind of premises, there are local network server 501, clients' mobile devices 502, terminals 503, connected to the local network server, peripheral equipment to process and to reproduce visual information 504 and audio information 505. Once the client's device 502 gets connected to the third party server 501, the program for the consolidated dynamic playlist creation 406 (FIG. 4) inquires for the favorite playlists 204 (FIG. 2), visual and/or audio information 207 of this client and rearranges consolidated dynamic playlist 222 and associated items list 223. The preferred way to connect to the local network server is via wireless connection protocol, such as WiFi. Once the client's device is detected, an invitation message is sent to it. The Client can confirm joining the session or decline it. Also, client may initiate client's participation in the session himself, using interface of the program installed on client's device.

Optionally, the local network may have one or more terminals 503, connected to the network with either wire or wireless connection. Client can use such terminal 503 either to establish activation of client's database 201 (FIG. 2) or enjoy taking part in the session as a temporary client of the system. This would not require formal registration—the system would just offer a default name with option to change it. In former cases, the client will be able to participate in the session both with prepared in advance favorite playlists 204 and order songs right during the session. In the latter case, the temporary client would be able to order songs during the session only. The system would allow each of the clients using terminals 503 to take part in the session for some certain amount of time with the option to extend it. Of course, the client that is registered in the system can still use such terminal and link to his personal database by logging under his user name. In this description terminals are considered as being in temporary use of clients and are treated the same way as clients' devices.

Figure 6:
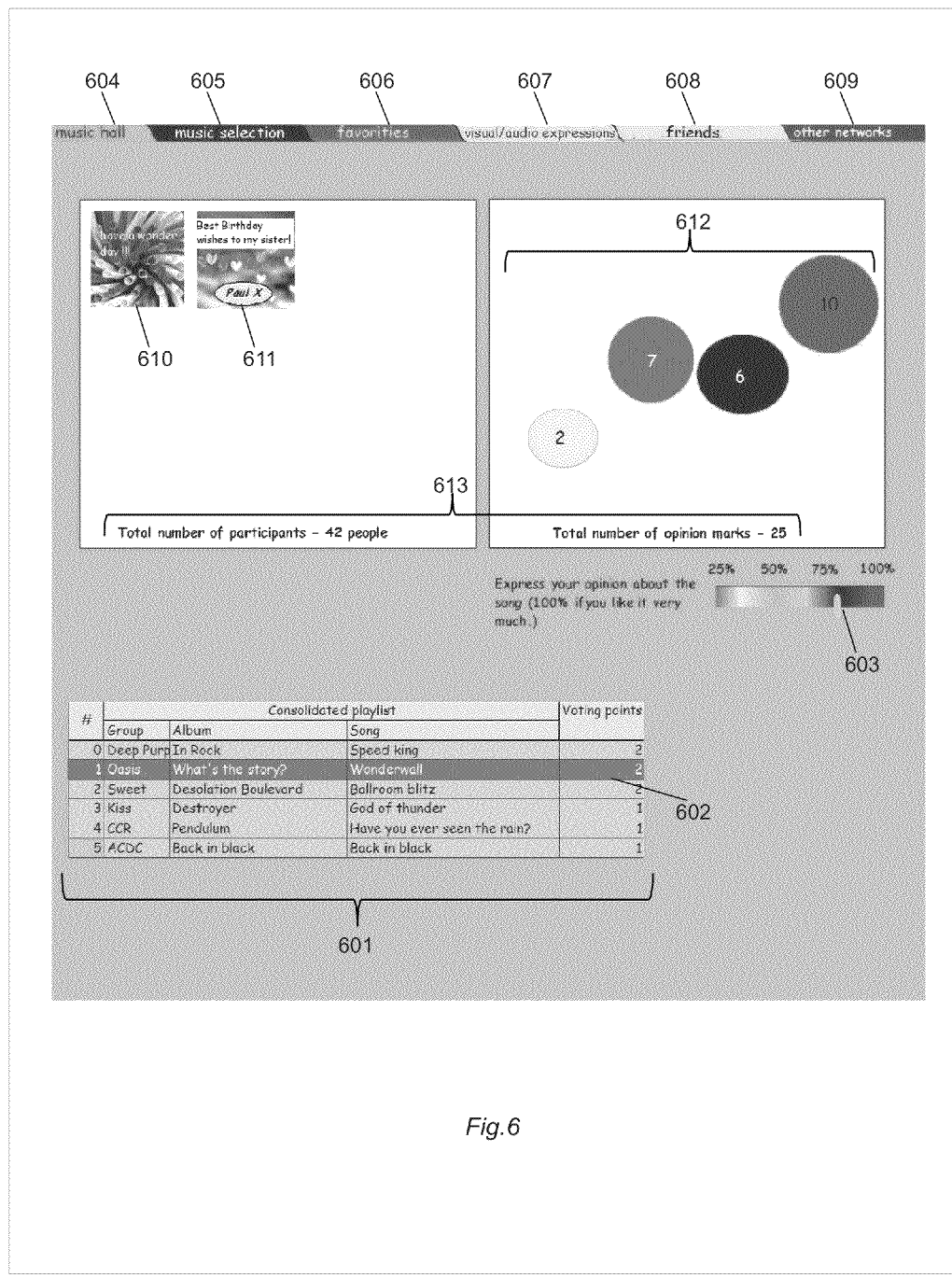
FIG. 6 is an example of a client user interface page with consolidated dynamic playlist, clients' associated items demonstration, clients' opinion mark control and diagram.

While the consolidated dynamic playlist 601 shown on the FIG. 6 is composed and updated number one of the list 602 is executed by some kind of a media player and the signals are conducted from the server 501 (FIG. 5) to the peripheral equipment 505 and 506 that is carrying out functions of reproducing audio 505 and visual 504 information. FIG. 6 shows an example of one of the user interface pages that is available for clients through devices 502, 503 (FIG. 5).

Figure 7:
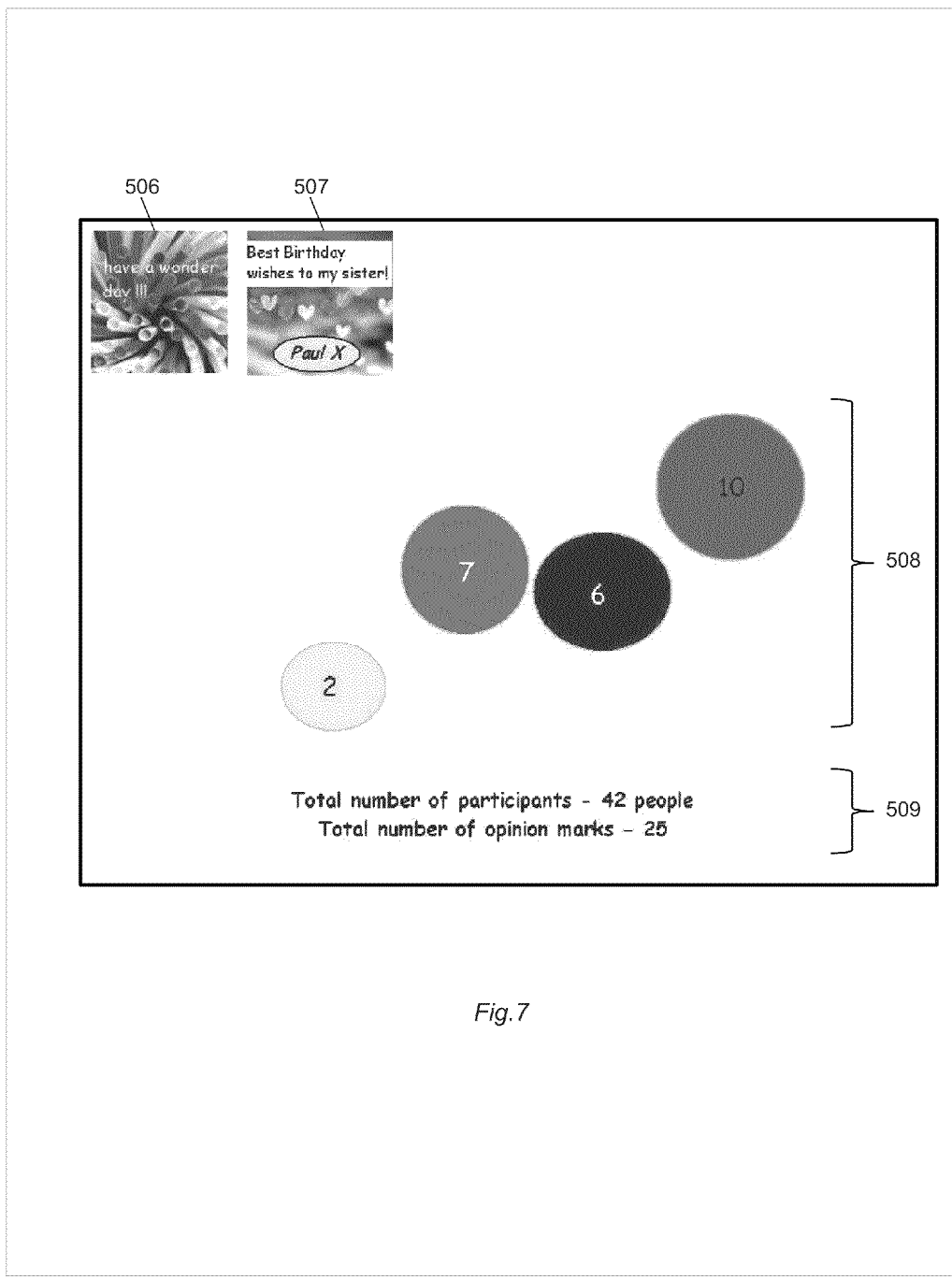
FIG. 7 is an example of an associated visual information display.

Beside audio and/or visual information reproduced for public entertainment according to the consolidated dynamic playlist 601, also associated information, provided by clients of the system, is reproduced. Logo, avatar, color stripe, an image that intends to identify the person who ordered a particular song could be displayed on the screen 504 (FIG. 5), which is a part of the peripheral equipment. Such image 506 or 507 can be associated whether with some part of the playlist of a client, or with one song depending on the choice of a client. Besides, the image may carry some specific information, like greetings or congratulations. In the given example, the same images 610 and 611 are displayed on the client's device's user interface page (FIG. 6). Another way clients can interact with the system is by giving an opinion mark to the reproduced music. This can be realized using, for instance, a spectrum pointer 603 that allows to assign a specified mark to a song. There are many ways the system can represent an accumulated opinion marks database. Given embodiment proposes to make a graphic representation formed as a balloon diagram 508 of FIGS. 5 and 612 of FIG. 6, where each of the balloons represents a range of marks, like 25 to 50% or 50 to 75%, and contains an information about number of opinions fallen within the range and having diameter and/or height proportional to the number of opinions within particular range and percentage distribution of different range opinions. This kind of associated information could be displayed both on peripheral equipment screen 504 (FIG. 5) and on client device's user interface page (FIG. 6). Both places can also reflect some statistic information 509 of FIGS. 5 and 613 of FIG. 6, for example number of participants and number of people who expressed their opinion about the current song. FIG. 7 depicts in larger scale separate view on the screen of the peripheral visual equipment 504 (FIG. 5) of the restaurant. Besides, some associated signals (music clip, some other sound, color blinking, etc.) can be used to identify the person or people who ordered a particular song, so such signals will take place before such a song will be played or right at the beginning of such a song playback for the public entertainment (such possibility is not reflected by the drawings).

Figure 8:
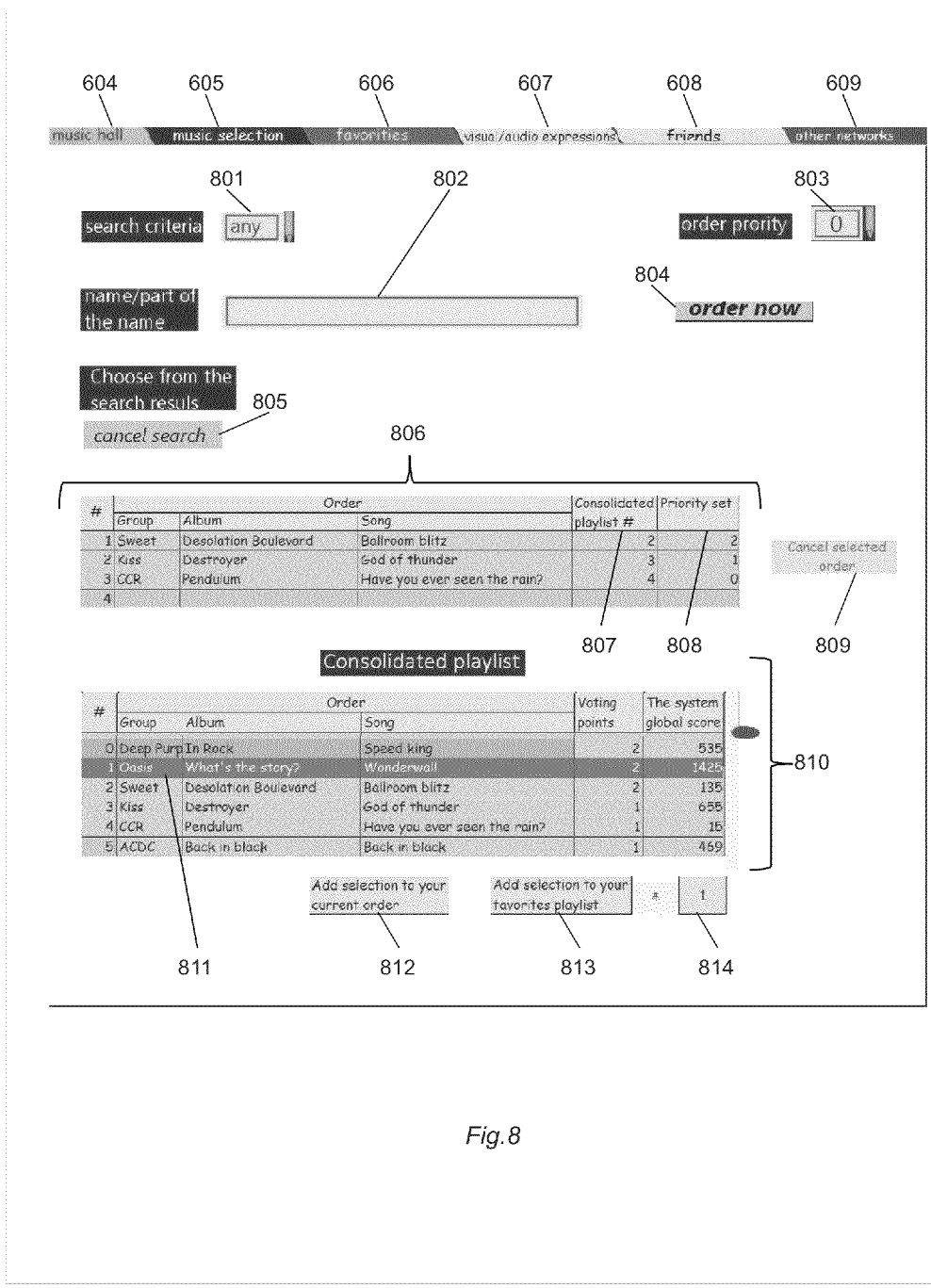
FIG. 8 is an example of a client user interface page with consolidated dynamic playlists; playlist items search window and some additional possibilities of playlist item manipulations.

Beside this user interface page 604, called "music hall" in the given example, there are other pages 605, 506, 607, 608, 609 and more depending on how the functionality of the interface is split between different pages. Individual client's playlists can be managed using page "favorites" 606. The drawing that depicts such page is not included in this description. Such page has to provide the following capabilities: search the system databases for a particular song, insert an item name into one of the playlists, copy, cut and paste item names, move them within a playlist and between playlists, switch the playlists to assign which one is an active playlist, etc. Setting one or more playlists active would make them available for the consolidated dynamic playlist creation by the system. Songs also can be ordered "on the fly", right during the session using page 605. Example of such page set-up is shown on the FIG. 8. It may contain fields to select and/or enter search criteria 801, name or part of the name of the searched item 802, order priority 803. The latter one allows raising a priority of individual order, which may be available for a client under certain agreement conditions. The interface allows confirming order 804 or canceling search result 805. After the order is confirmed it appears in the table of ordered items 806. Column 807 indicates current number of ordered items in the consolidated dynamic playlist 810. Priority level is shown in the column 808 and can be edited by the client. Also, orders can be canceled using button 809 prior to its execution. The consolidated dynamic playlist 810 is an important tool for manipulation with current order of a particular client and his playlists as well. Selected item 811 can be added whether to current order using button 812 or to one of the client's playlists using button 813 with number of the playlist selected using window 814 prior to pushing button 813. Adding an item to the current order affects the consolidated dynamic playlist 810 and may move the added item up in the list.

Similarly to individual playlist databases 204, 205, . . . , 206 (FIG. 2), client of the system can create databases of associated media items 207, 208 . . . , 209. User interface can provide corresponding tools located on page 607 (FIG. 6). Views of such pages are not included in this description. Page 607 is supposed to provide the following capabilities: search the system databases and/or other Internet resources for a particular media, like picture, audio and/or video clip, etc., insert an item into one of the associated media item lists, copy, cut and paste items, move them within a list and between different lists, switch the lists to assign which one is an active list, associate media items with separate songs, groups of songs or entire database, assign some rules for playing/displaying media items, disable any associated media items to be played/displayed etc. Some or all of the files provided by the system may be used as templates and modified by a client. As an example of usage of such functionality can be a simple case when a client selects the system's template with sunrise view, for instance, put his name on top of it and assign this single image to his entire database. Also, he selects that a fraction of any ordered song will be used as an indicative file. So, at the moment there is a turn for his song to be played, two events will take place. First, the fraction of ordered song will be reproduced by the client's device right before the entire song will be reproduced by the system peripheral audio equipment 505 (FIG. 5). Second, while the song being reproduced publicly by the system peripheral audio equipment 505, said image of a sunrise with the client name will be displayed by the system peripheral visual equipment 504 and on the client device interface page.604 (FIG. 6). Obviously, the same events will take place in respect to other clients who ordered the same song. In their case sound and/or image may be different.

Beside clients' database and preference settings, the local network server and entire system may have their own databases and configuration settings. For example, the system may have two playlists that participate in a particular session: one with promotional selection with mandatory participation in the consolidated dynamic playlist creation with basic level of priority and the second one with some general selection and lower priority. The purpose of the latter one would be just to provide additional resources in case there are not enough clients connected to the system. Depending on usage of the system, there may be different configuration settings assigned to the server. For instance, if the system is used as a private home entertainment mean, then it may make sense to assign the highest priority to the first item on the playlist of the database of the client just joining the session.

Summarizing, the typical session of an individual client of the system may look like the following. Assuming the person is registered with the system, once he/she enters the area where a particular server or servers are accessible, the system sends an invitation to participate in the session. The client accepts the invitation or selects between two or more local network servers. Once connection is established, the client's database is identified and client's playlist is converted into a request and the system recomposes the consolidated dynamic playlist. When there is a turn for the client's database song to be reproduced with peripheral equipment, both associated files and the song itself are played/displayed as described above. This would repeat every time the client's database song gets on the first position of the consolidated dynamic playlist. In case the client would like some song played during this session he may add it to his playlist or order it for this particular session using interface on his mobile device. Also, the client may participate in the music part of this social event by expressing his opinion about the song played as it was explained above. The client can use the convenience of copying an item name from the consolidated dynamic playlist to the client's own playlist. Once the client physically leaves the area covered with a particular local network server wireless connection or when the client chooses to interrupt the connection, then the client's request is canceled and the system recomposes the consolidated dynamic playlist.

Figure 9:
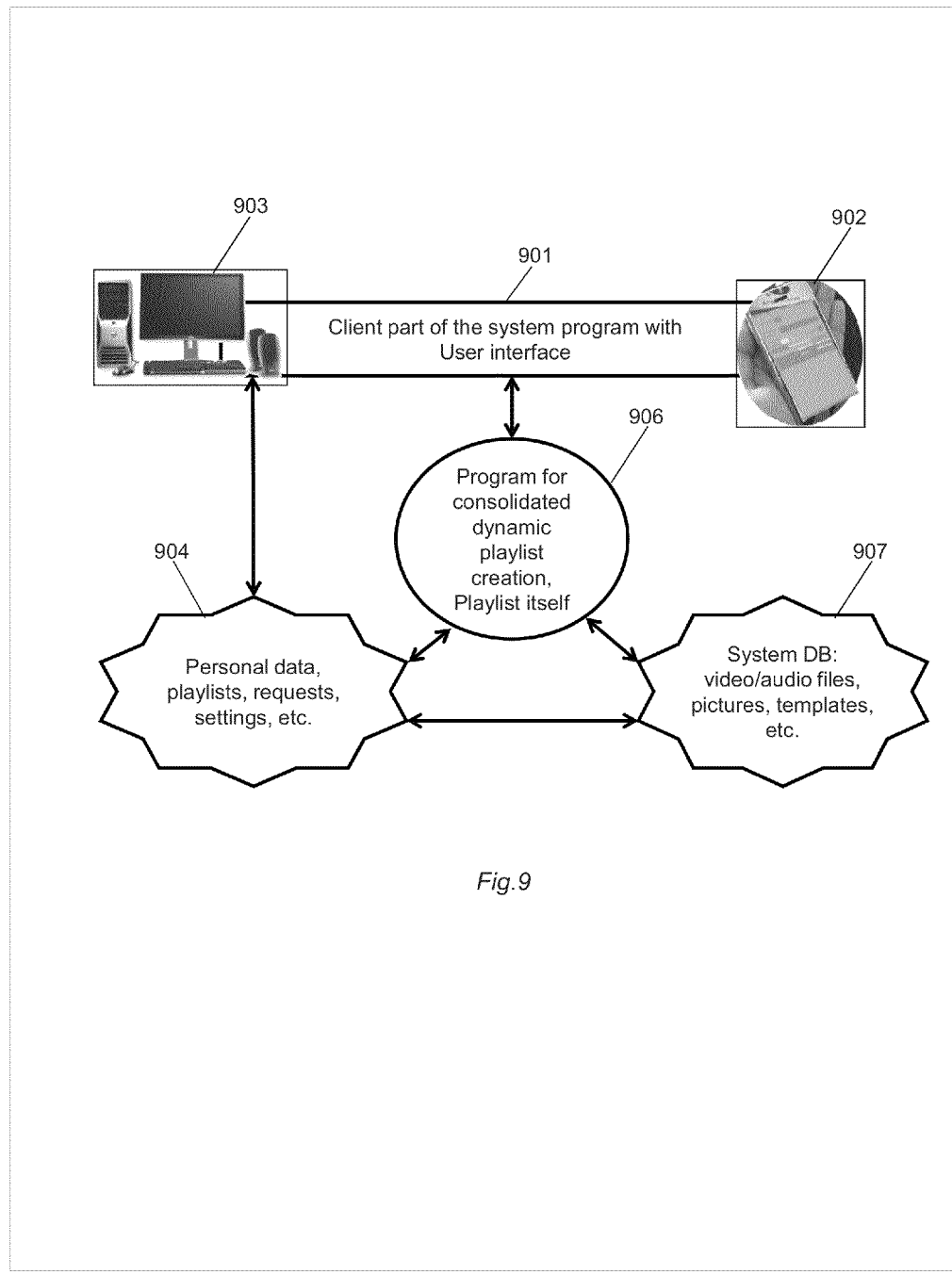
FIG. 9 is a schematic of the system top level connection configuration.

Connection type 305 (FIG. 3) operation is outlined on FIG. 9. It assumes that a client has the client part of the system program 901, installed on his mobile 902 and/or desktop 903 devices. This program contains the client's identity information and links his device to his personal database 904. Client's devices 902 or 903 may communicate with corresponding client database 904 directly. The program for consolidated dynamic playlist creation 906 gets necessary information from the client database 904 and system database 907. Client's devices 902 or 903 access required media files from the system databases 907 per consolidated dynamic playlist 906. Client's devices 902 or 903 reproduce requested and associated files Following is the description of the way the system under direct connection (type 305) works. A client can join the session once such person gains access to the internet or at the client's option any time later when still connected to the Internet with his mobile 902 and/or desktop 903 devices, like smartphone, PC, netbook PC, etc. The client can receive and accept an invitation from the system to join the session or initiate his/her participation in the session himself/herself. The session will look the same as in the case of down level connection (type 304 of FIG. 3) with the only difference that the items from the consolidated dynamic playlist will be reproduced in most cases on each of clients' devices.

Figure 10:
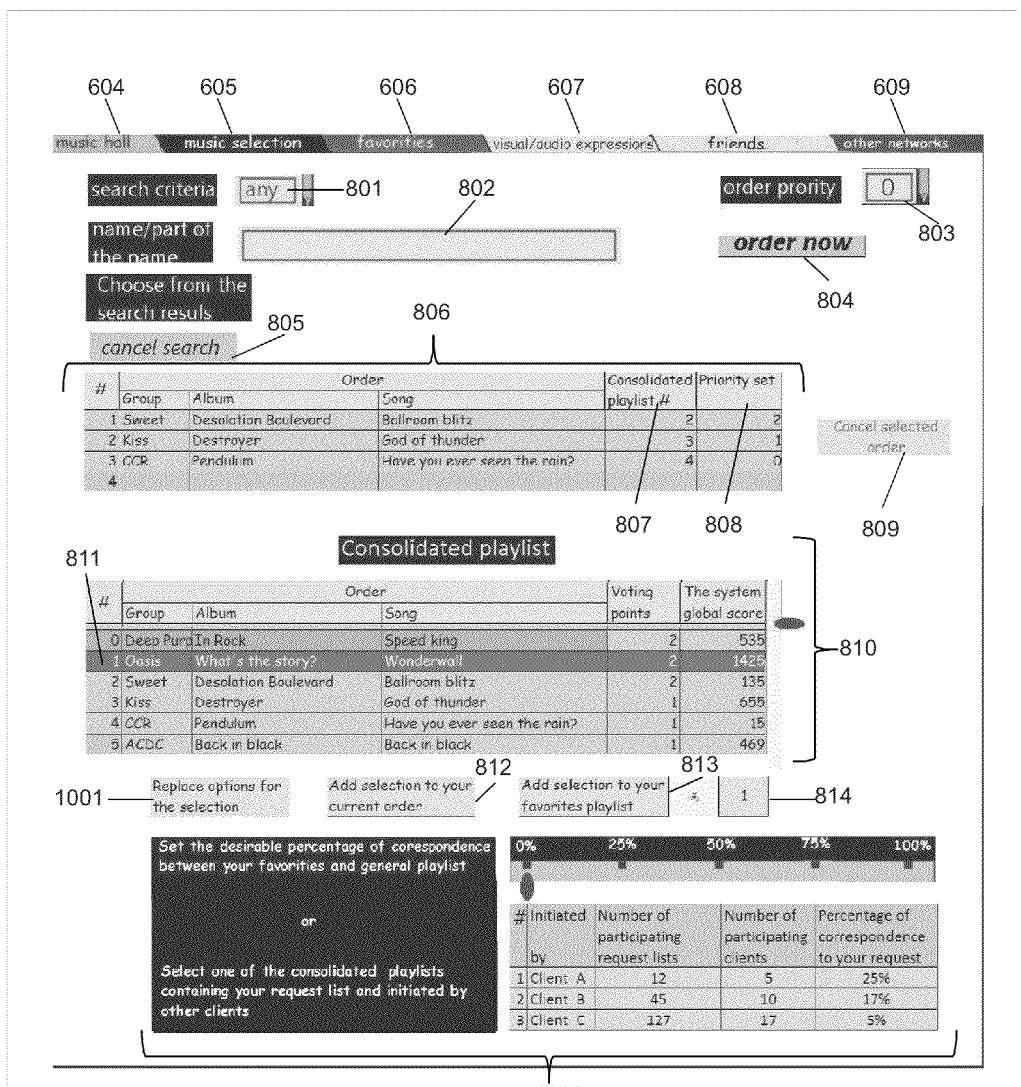
FIG. 10 is an example of a client user interface page with consolidated dynamic playlist; playlist items search window; and some additional possibilities of playlist item manipulations in application to direct top level connection to the system.

General options and user interface for this connection type would be similar to the ones described for the connection type 304 (FIG. 3). However, since this connection type represents the utilization of the consolidated dynamic playlist mostly for personal entertainment, the system may provide some additional options. FIG. 10 shows how one of the user interface pages may look like for this type of connection. In addition to the features present on the corresponding page of the down level connection (FIG. 8), it can contain an option 1001 to enable replacement of specified item with an item from the specified playlist. This way any time some specified item or items appear on the consolidated dynamic playlist they would be replaced with some specified item or items from the client's playlist. Thus, the system is rendering assistance for the most enjoyable selection of items and avoiding items the client dislikes. Replacement items duration could be shortened if needed. Also tool 1002 can be used. It can adjust the general playlist to the taste of the client. The client can cut off some of the items or individual playlists by specifying how high the shell is a percentage of correspondence between his/her playlist and consolidated dynamic playlist or other clients' request lists. Setting 100% for this parameter would transform the consolidated dynamic playlist into individual request lists and vice versa, setting it to 0% would mean no limitations or filtration applied to the consolidated dynamic playlist or individual request lists that form such a consolidated dynamic playlist.

By making such an adjustment, the client initiates a separate consolidated dynamic playlist generation. There are certain clients' request lists involved in such consolidated dynamic playlist composition. Each of these clients would have a chance to join this spontaneous subnetwork. There may be several consolidated dynamic playlist sessions running simultaneously, which include certain client's request lists. So, one may have several options as to which session to take part in. The system would give important information about each of these sessions, like number of request lists, number of people taking part in each session, percentage of correspondence to one's own request list.

Figure 11:
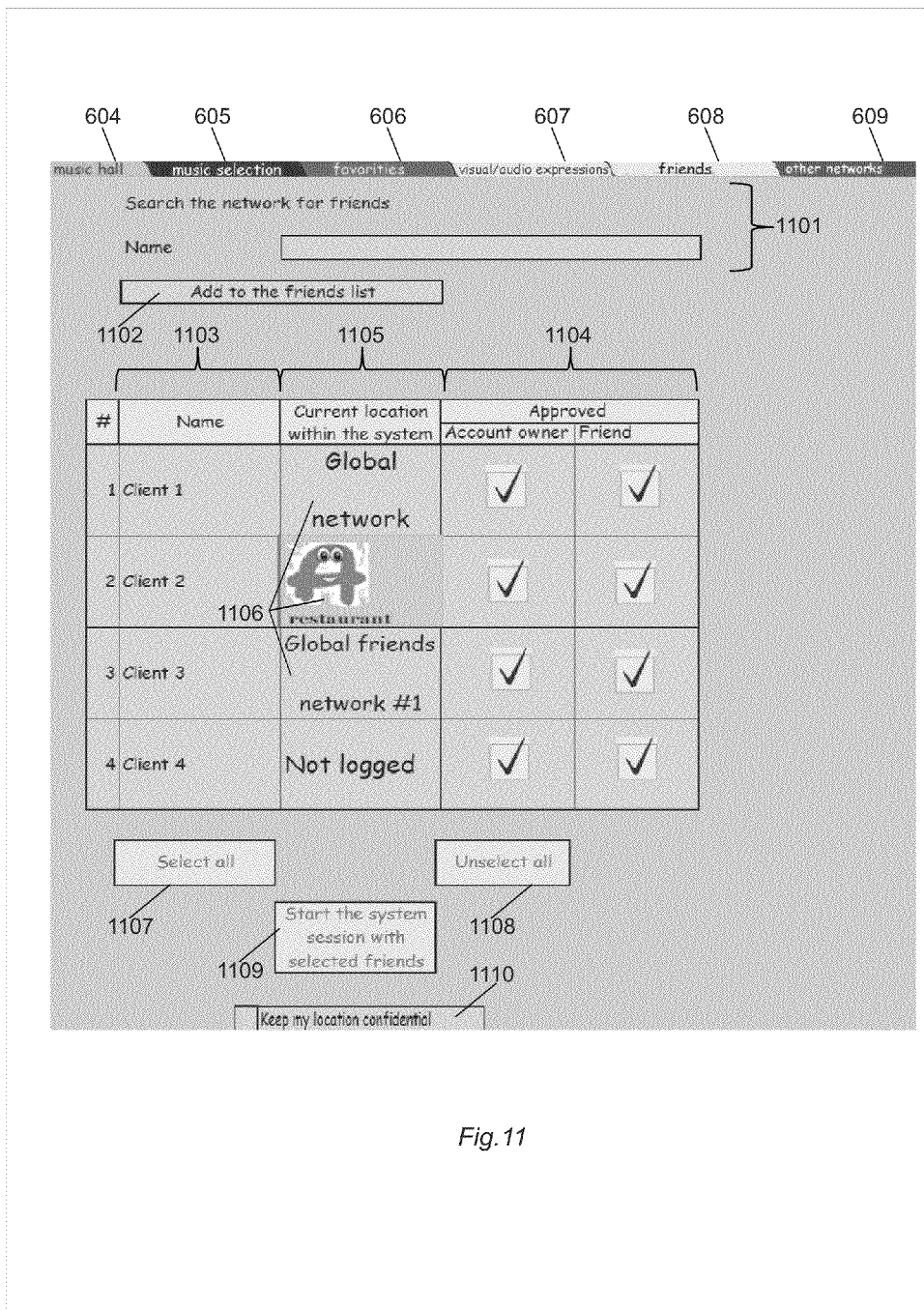
FIG. 11 is an example of a client user interface page, which allows clients of the system to establish "friend" status and start the system session with selected friends.

Two or more clients may establish co-relation between their databases using user interface page "Friends" 608 (FIG. 11). Such clients can be also local network servers. Such page shell provides basic options to search 1101, add 1102 to the friends list 1103 and approve 1104 the status of other clients in the system. The page also may identify or provide a tool for finding current location 1105 of the friend's device. In given example logo or name of the network 1106 appears next to the friend's name. The client can select any number of friends from his/her list 1103 by clicking on corresponding names or pushing "select all" button 1107 (all selections can be canceled by pushing "unselect all" button 1108) and initiate a new session by pushing button 1109, which would act exactly like any local network: selected friends will receive an invitation and the databases of those ones that accepted the invitation will be the base for composition of the consolidated dynamic playlist. Such global networks would appear on the list of the friends' location. The client can access any network by clicking on the corresponding logo. The client also may choose his location not to be shown to anyone by ticking the option 1110. Some examples of implementation of a mutual session between clients/local network servers may be restaurants or store chains or distant family's events.

Figure 12:
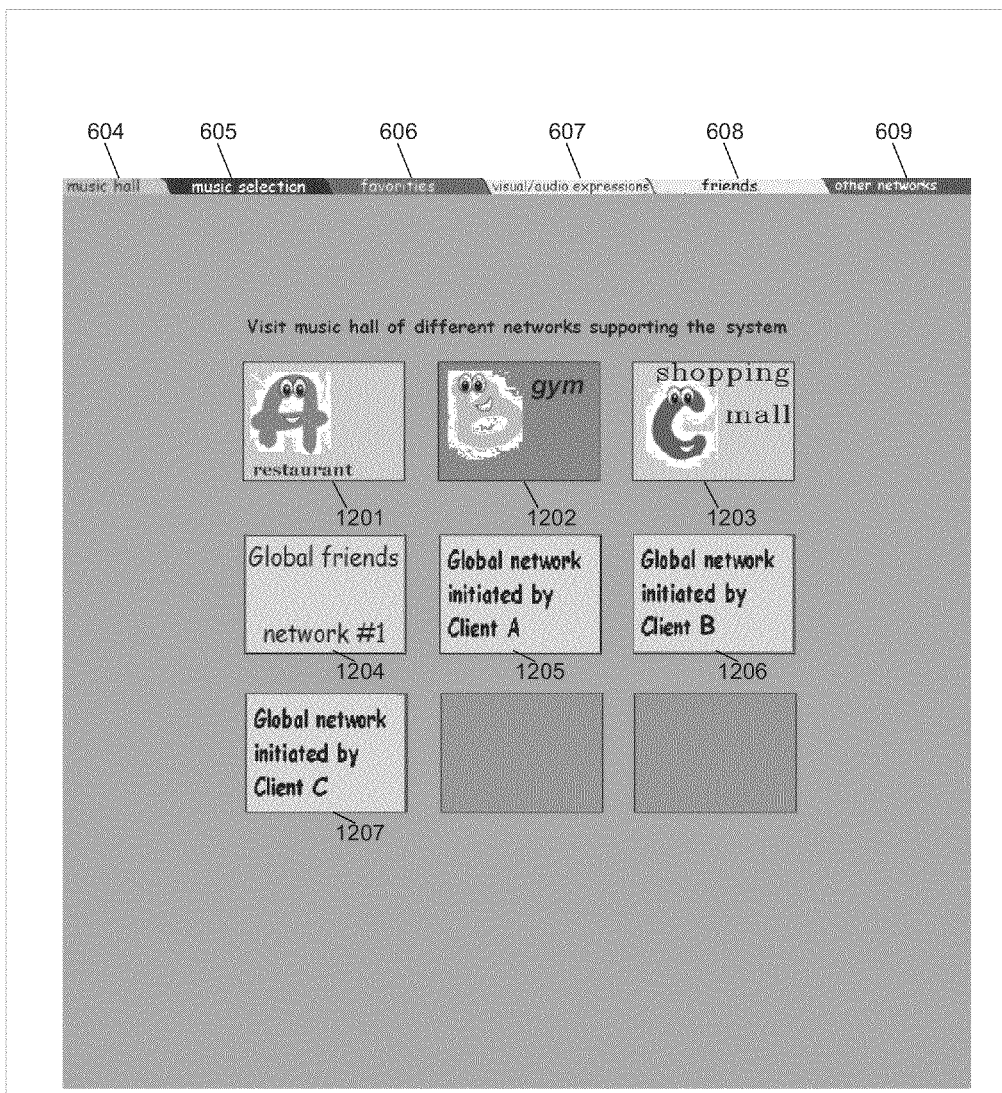
FIG. 12 is an example of a client user interface page, which allows visiting different networks of the system.

FIG. 12 shows the user interface page 609 that allows browsing through different local and global networks of the system. Such pages can contain links 1201, 1202, 1203, 1204, 1205, 1206, 1207 to other networks that are different than the current connection of the client. By accessing other networks, the client will be able to enjoy in real time audio and visual content of the corresponding network consolidated dynamic playlist and list of associated files. Besides, any client of the system may participate in ongoing sessions of a local network, providing that at least one of his/her friends with his communication device is physically connected to the local network server and providing that such friend does not object to the client to participation on his behalf. Also, there may be a server setting that allows remote clients to participate in the local network consolidated dynamic playlist session without any conditions or limitations.

Following are some examples of how individual clients can use the system. This is just a summary of the detailed description above.

EXAMPLE A

Client uses his home computer (or for this matter any computer) or mobile device to log on and participate in global consolidated dynamic playlist composition and enjoys outcoming audio and visual material. Type of music played could be narrowed down to match the client's own playlist to a specified degree. Ultimately, the client can choose to play his own playlist.

EXAMPLE B

Client receives an invitation on his mobile communication device, accepts it and participates in local, for instance, some restaurant, consolidated dynamic playlist composition and enjoys audio and visual material played/displayed by peripheral equipment, as well as interaction factors, as described above.

EXAMPLE C

Client uses his home computer (or for this matter any computer) or mobile device to log on and participate in friends' consolidated dynamic playlist composition and enjoys outcoming audio and visual material as described above. Such friends' consolidated dynamic playlist may participate in global consolidated dynamic playlist composition. Type of music played could be narrowed down to match the friends' own consolidated dynamic playlist to a specified degree.

EXAMPLE D

Client uses his own server, whether stationary or mobile device, to initiate session, so his family members, friends, and/or visitors could be invited to participate in local consolidated dynamic playlist composition and enjoy outcoming audio and visual material played/displayed by peripheral equipment as described above.

EXAMPLE E

Client uses his home computer (or for this matter any computer) or mobile device to find his friend's location and participate in the same consolidated dynamic playlist composition on behalf of his friend and associate some visual file containing congratulations or gritting.

EXAMPLE F

Under any kind of the system usage, client can easily copy any of the consolidated dynamic playlist items to his own playlist.

Within this description, it's assumed that all the databases required for the system to function can be located whether on the Internet source or on any local server. This description refers mostly to the former configuration. Nevertheless, the latter one is assumed to be one of the possible embodiments of the method of and system for multilevel creation of consolidated dynamic playlist and for utilization of one. The system could be closed and isolated from the standpoint of the Internet. Moreover, instead of a single server device, there might be a plurality of user devices that store necessary databases and one of them containing a means to compose consolidated dynamic playlist out of individual playlists and reproducing the consolidated dynamic playlist items via internal circuits or peripheral equipment. Such devices would need to be connected using a protocol for wireless or wire connection. Technical means and methods for establishing network connection, executing media files, streaming, final audio/visual reproduction are not described within this description. They may differ substantially depending on actual configuration of the system embodiment. Nevertheless, appropriate means are generally known and used in the industry.

It's also assumed that all or some of the databases represented by the system consolidated dynamic playlist and the list of associated files can be created by the clients of the system and can be combined with databases that represent intellectual property of third parties. For instance, short speeches or toasts can form one of the system databases and be represented in the consolidated dynamic playlist along with titles of songs and music compositions. Also, it's assumed that more than one consolidated dynamic playlist can be played and/or displayed simultaneously. For instance, under some local network of the system, family photo albums of participants of that particular session can form the database for creation of first consolidated dynamic playlist and their music playlists can participate in composing the second consolidated dynamic playlist, which playlists can be executed whether independently or with some correlation established by the system.

It's still assumed that all or some of the databases represented by the system consolidated dynamic playlist may have non-electronic form. For example, consolidated dynamic playlist items can be reproduced as live music by musicians.

What is claimed is:

1. A method of multi-level creation of a consolidated dynamic playlist comprising the steps of:
   a) connecting into a database on a website;
   b) adding at least one of a playlist, an item name and at least one corresponding list of associated items to the database;
   c) adding an input consolidated dynamic playlist and corresponding lists of associated items to the database;
   (d) identifying all clients currently connected to the system and corresponding playlists, the item names, input consolidated dynamic playlists and all lists of associated items that correspond to all said lists and item names;
   e) converting the playlists, the input consolidated dynamic playlists, and the item names that correspond to the currently connected clients into a plurality of input request lists and then into a plurality of input requests by using a computer algorithm;
   f) composing at least one consolidated dynamic playlist by using the computer algorithm to compare and align the plurality of input requests with a plurality of system playlists forming a list of items, and aligning items of individual lists of associated items and the system lists of associated items with the consolidated dynamic playlist items;
   (g) establishing a correlation between such consolidated dynamic playlist, participating individual request lists and corresponding clients and making this particular consolidated dynamic playlist available for such clients;
   h) playing and/or displaying a first item of at least one consolidated dynamic playlist and corresponding associated items; and
   optionally storing the list of items.

2. A method of multi-level creation of a consolidated dynamic playlist comprising the steps of:
   connecting into a database on a website;
   adding at least one of a playlist, an item name and at least one list of associated items to the database;
   adding an input consolidated dynamic playlist and corresponding lists of associated items to the database;
   converting the playlist, the input consolidated dynamic playlist, and the item names into a plurality of input requests by using a computer algorithm;
   composing a consolidated dynamic playlist by using the computer algorithm to compare and align the plurality of input requests with a plurality of system playlists forming a list of items, and aligning items of individual lists of associated items and the system lists of associated items with the consolidated dynamic playlist items;
   playing and/or displaying a first item of the list of the consolidated dynamic playlist and corresponding associated items;
   optionally storing the list of items;
   selecting the input request lists based on a frequency of appearance of mutual item names on each request list, using selected input request lists for composing at least one consolidated dynamic playlist;
   wherein the method allows a client to make an adjustment by requesting match percentage of matching item names in an individual input request list relative to the client's request list, wherein the match percentage is a variable for determining the selection of participating input request lists out of the plurality of request lists available within the system at the given moment for creating at least one consolidated dynamic playlist.

3. The method according to claim 1, wherein the computer algorithm is based on a sequence of a first request of a first client relative to a first request of a second client, frequency of the item name on each request list, a client status, an input consolidated dynamic playlist priority level, and a time period after a last execution of a particular item.

4. The method according to claim 1, wherein the consolidated dynamic playlist depends on at least one different consolidated dynamic playlist run within the system.

5. The method according to claim 1, further including selecting the input request lists based on a frequency of appearance of mutual item names on each request list, using selected input request lists for composing at least one consolidated dynamic playlist.

6. The method according to claim 1, in which a specified item name on the consolidated dynamic playlist is replaced when executed for a first client with the client's playlist item names by the choice of the first client.

* * * * *